United States Patent [19]

Tomlinson

[11] Patent Number: 5,262,115
[45] Date of Patent: Nov. 16, 1993

[54] METHOD AND DEVICE FOR PRODUCING VEHICLE TIRE BEAD-BEAD FILLER ASSEMBLIES

[75] Inventor: Gordon M. Tomlinson, Rome, Italy

[73] Assignee: Bridgestone/Firestone, Inc., Akron, Ohio

[21] Appl. No.: 811,163

[22] Filed: Dec. 19, 1991

[30] Foreign Application Priority Data

Feb. 12, 1991 [IT] Italy .................. TO91A 000086

[51] Int. Cl.$^5$ .................. B29C 45/14; B29D 30/48
[52] U.S. Cl. .................. 264/265; 264/271.1; 264/277; 264/278; 264/297.2; 425/116; 425/129.1; 156/136
[58] Field of Search .................. 264/259-262, 264/271.1, 277, 328.1, 328.2, 328.8, 328.16, 328.18, 328.3, 328.15, 278, 279, 297.1, 297.2, 297.8, 265; 425/123, 124, 125, 501, 502, 28.1, 34.2, 35, 36, 572, 577, 588, 113, 114; 156/140, 136-139, 500; 249/63, 64, 107, 110, 181, 176

[56] References Cited

U.S. PATENT DOCUMENTS

| | | | |
|---|---|---|---|
| 1,576,184 | 3/1926 | Freeman | 425/34.2 |
| 2,351,774 | 6/1944 | McGowen | 425/576 |
| 2,410,510 | 7/1942 | Lester | 425/547 |
| 2,569,303 | 9/1951 | Garbin | 425/34.2 |
| 2,883,701 | 4/1959 | Sauer | 425/34.2 |
| 2,885,733 | 5/1959 | Chupa | 425/576 |
| 4,168,193 | 9/1979 | Brunet et al. | 152/540 |
| 4,174,367 | 11/1979 | Breher | 425/153 |
| 4,277,295 | 7/1981 | Schmidt et al. | 152/560 |

FOREIGN PATENT DOCUMENTS

| | | |
|---|---|---|
| 52-63974 | 5/1977 | Japan .................. 156/136 |
| 1117942 | 6/1968 | United Kingdom . |
| 2007578 | 5/1979 | United Kingdom . |

Primary Examiner—Michael W. Ball
Assistant Examiner—Robert W. Robey
Attorney, Agent, or Firm—D. A. Thomas

[57] ABSTRACT

A method and device for producing vehicle tire bead-bead filler assemblies (2), whereby green elastomeric material is injected, by means of an externally-cooled distribution tank (38), into a number of annular chambers (22) defined by two half molds (6, 7) closed about a substantially cylindrical inner core (8); an inner portion of each chamber (22) being occupied by a respective bead (3) preassembled onto the core (8), and an outer portion (32) of each chamber (22) constituting the molding chamber of a respective bead filler (4).

12 Claims, 4 Drawing Sheets

METHOD AND DEVICE FOR PRODUCING VEHICLE TIRE BEAD-BEAD FILLER ASSEMBLIES

TECHNICAL FIELD

The present invention relates to a method of producing vehicle tire bead-bead filler assemblies.

BACKGROUND OF THE ART

The known method of producing bead-bead filler assemblies consists of producing metal beads, usually coated with elastomeric material, and, separately, an elongated extruded element of elastomeric material having a substantially triangular cross section, which is cut transversely into portions of the same length as the respective beads. Said bead filler portions are usually cut on a slant or angle so that each presents two opposed bevels which, when such a portion is placed or bent about its respective bead, are pressed together to produce a substantially continuous annular bead filler. Though successful, the above technique presents a number of drawbacks.

Firstly, being produced in sizable lots for subsequent application, at times even weeks after manufacture, sad elongated, substantially triangular-section element undergoes considerable uncontrolled shrinkage, with the result that the section of the bead filler varies from one lot to another.

Secondly, skilled labor and a good deal of time are required for cutting said elongated element into portions; applying each portion to the outer periphery of the bead; and connecting, usually by means of an adhesive, the opposite ends of each portion to form a respective bead filler.

Thirdly, the above known technique fails to provide for a jointfree bead-bead filler assembly, which joint, even if executed skillfully, invariably has a negative effect on the uniformity of the finished tire.

In regard to the uniformity of the finished tire, an important point to bear in mind is that, being originally straight, said bead filler portions preserve a tendency to revert to their original form, thus resulting in internal stress which tends to ovalize the finished bead-bead filler assembly.

SUMMARY OF THE INVENTION

The aim of the present invention is to provide a method of producing bead-bead filler assemblies, designed to at least partially eliminate the aforementioned drawbacks. With this aim in view, according to the present invention, there is provided a method of producing vehicle tire bead-bead filler assemblies, characterized by the fact that it comprises steps consisting in mounting, in an orderly sequence, a number of annular beads onto a supporting body constituting the removable inner core of a mold comprising two half molds, said core defining, in an operating position between said half molds, the inner periphery of a number of annular chambers designed to receive a respective assembly; mounting said core in said operating position; injecting elastomeric material simultaneously inside said annular chambers for forming a bead filler of elastomeric material about each bead; and opening said half molds for removing said core and said assemblies; said elastomeric material being injected inside said annular chambers via a distribution tank communicating with all said annular chambers.

The present invention also relates to a device for implementing the noted method. According to the present invention, there is provided a device for producing vehicle tire bead-bead filler assemblies, characterized by the fact that it comprises a device for injecting elastomeric material; and a mold connected to said injection device and in turn comprising a first and second half mold and a removable inner core which, when mounted in an operating position between said half molds, defines, with said half molds, a number of annular chambers coaxial with and defined internally by said inner core; each annular chamber comprising an inner annular portion for receiving a respective bead mounted on said core, and an outer annular portion constituting a molding chamber for a respective said bead filler; said injection device comprising a distribution tank communicating with said molding chambers.

BRIEF DESCRIPTION OF THE DRAWINGS

A non-limiting embodiment of the present invention will be described by way of example with reference to the accompanying drawings, in which.

Figure 1:
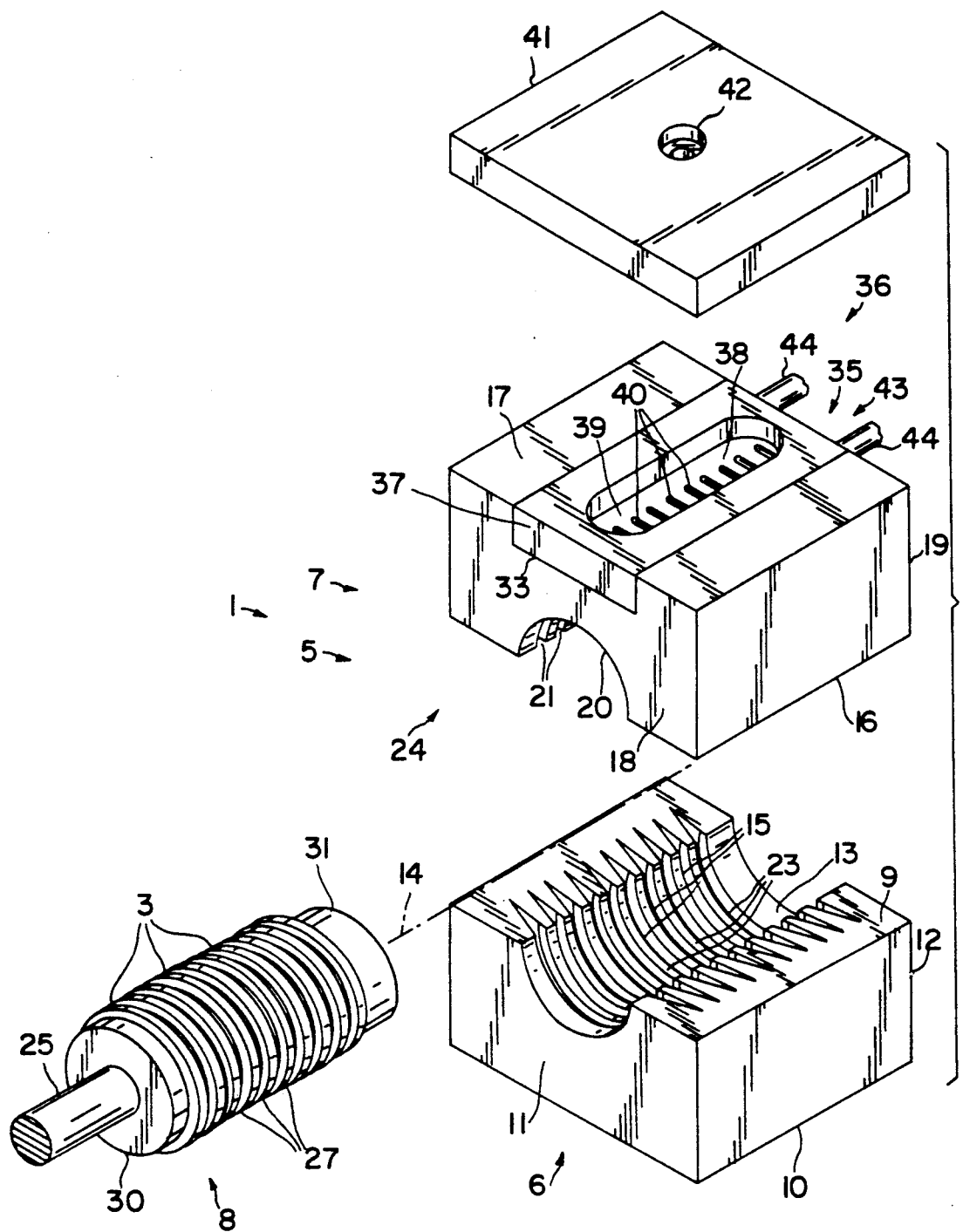
FIG. 1 shows an exploded view in perspective, with parts removed for simplicity, of a preferred embodiment of the device according to the present invention.

Number 1 in FIG. 1 indicates a device for producing bead-bead filler assemblies 2 (FIGS. 6 and 7) comprising an annular bead 3 to the outer periphery of which is integrally connected the inner periphery of an annular bead filler 4 (FIGS. 6 and 7) of elastomeric material having a substantially triangular cross section and extending substantially radially outwardly from respective bead 3. Device 1 comprises a mold 5 in turn comprising a lower half mold 6, an upper half mold 7, and a removable, substantially cylindrical inner core 8.

Half mold 6 is substantially in the form of a parallelepipedon, and is defined by a flat top surface 9 constituting the supporting surface for half mold 7. Half mold 6 is also defined by a bottom surface 10 parallel to top surface 9, and by two parallel lateral surfaces 11 and 12, perpendicular to surfaces 9 and 10. Surface 9 includes, perpendicular to surfaces 11 and 12, a central axial groove 13 having a substantially semicircular cross section, extending along the entire length of surface 9 between surfaces 11 and 12, and having a central axis 14 on surface 9. Half mold 6 also includes an orderly, uniform sequence of semicircular transverse grooves 15 of substantially triangular cross section, each extending along the surface of groove 13 in a respective plane perpendicular to axis 14, and each opening out at the opposite ends on to surface 9.

Half mold 7 is also substantially in the form of a parallelepipedon, and is defined by a flat bottom surface 16 adapted for contacting top surface 9 of half mold 6. Half mold 7 is also defined by a top surface 17 parallel to surface 16, and by two parallel lateral surfaces 18 and 19 perpendicular to surfaces 16 and 17 and coplanar with respective surfaces 11 and 12.

Surface 16 includes, perpendicular to surfaces 18 and 19, a central axial groove 20 having a substantially semicircular cross section, extending along the entire length of surface 16 between surfaces 18 and 19, and having central axis coincident with axis 14 and located on contacting surfaces 9 and 16. Half mold 7 also includes an orderly, uniform sequence of semicircular transverse grooves 21 of substantially triangular cross section, each extending along the surface of groove 20 in a respective plane perpendicular to axis 14. Each groove 21 opens out at the opposite ends onto surface 16 in a position coincident with and facing the opposite ends of a respective groove 15, and defines, with groove 15, an annular chamber 22 separated from the adjacent chamber 22 by a cylindrical strip 23 formed on the surface of a cylindrical through seat 24 defined through mold 5 by mating grooves 13 and 20.

Figure 3:
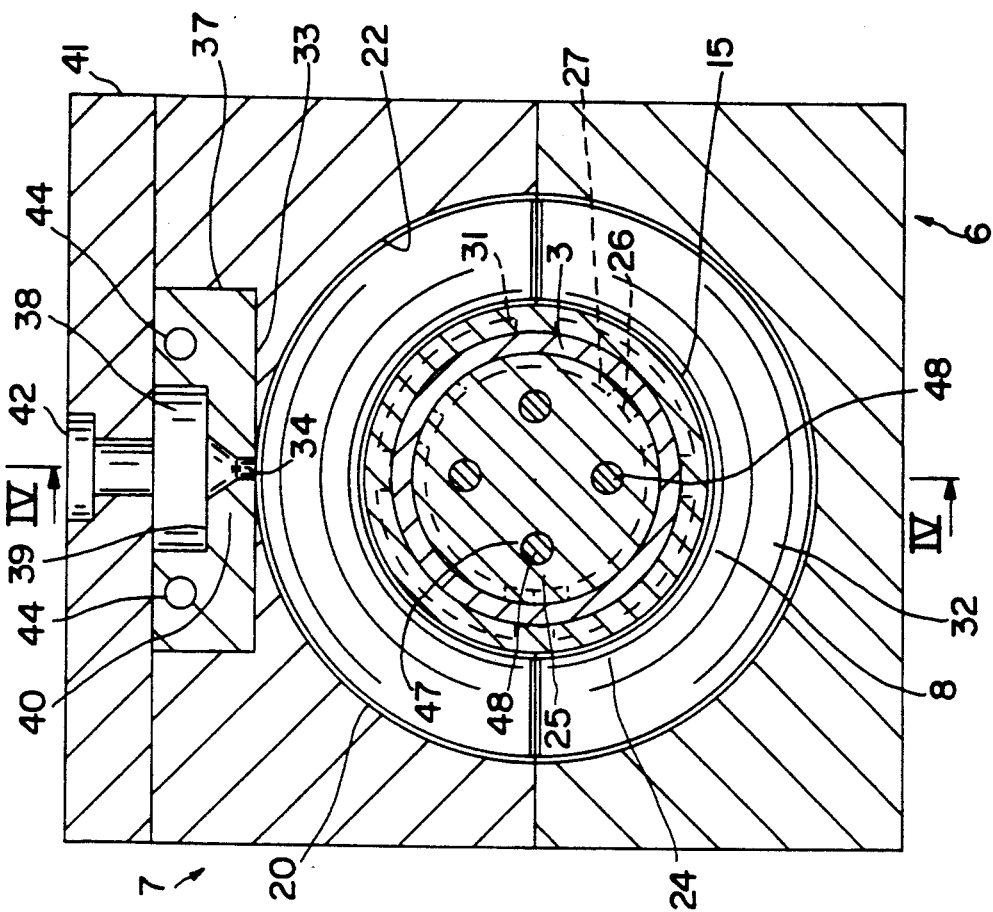
FIG. 3 shows a section taken along line III—III in FIG. 2.
Figure 2:
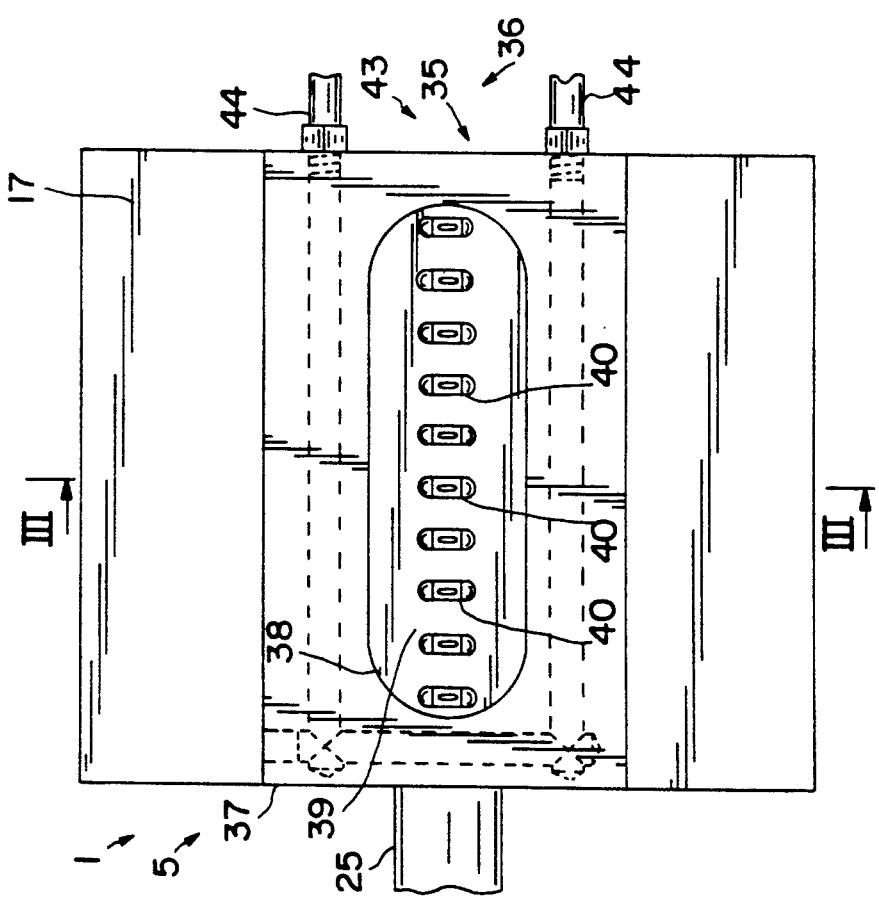
FIG. 2 shows a plan view of the FIG. 1 device, with parts removed for simplicity.

Seat 24 houses cylindrical inner core 8 which, as shown particularly in FIG. 3, comprises a central shaft 25 having a cylindrical outer surface 26 coaxial with axis 14 and constituting the sliding and supporting surface of a number of substantially annular spacer rings 27 supporting respective beads 3.

Figure 4:
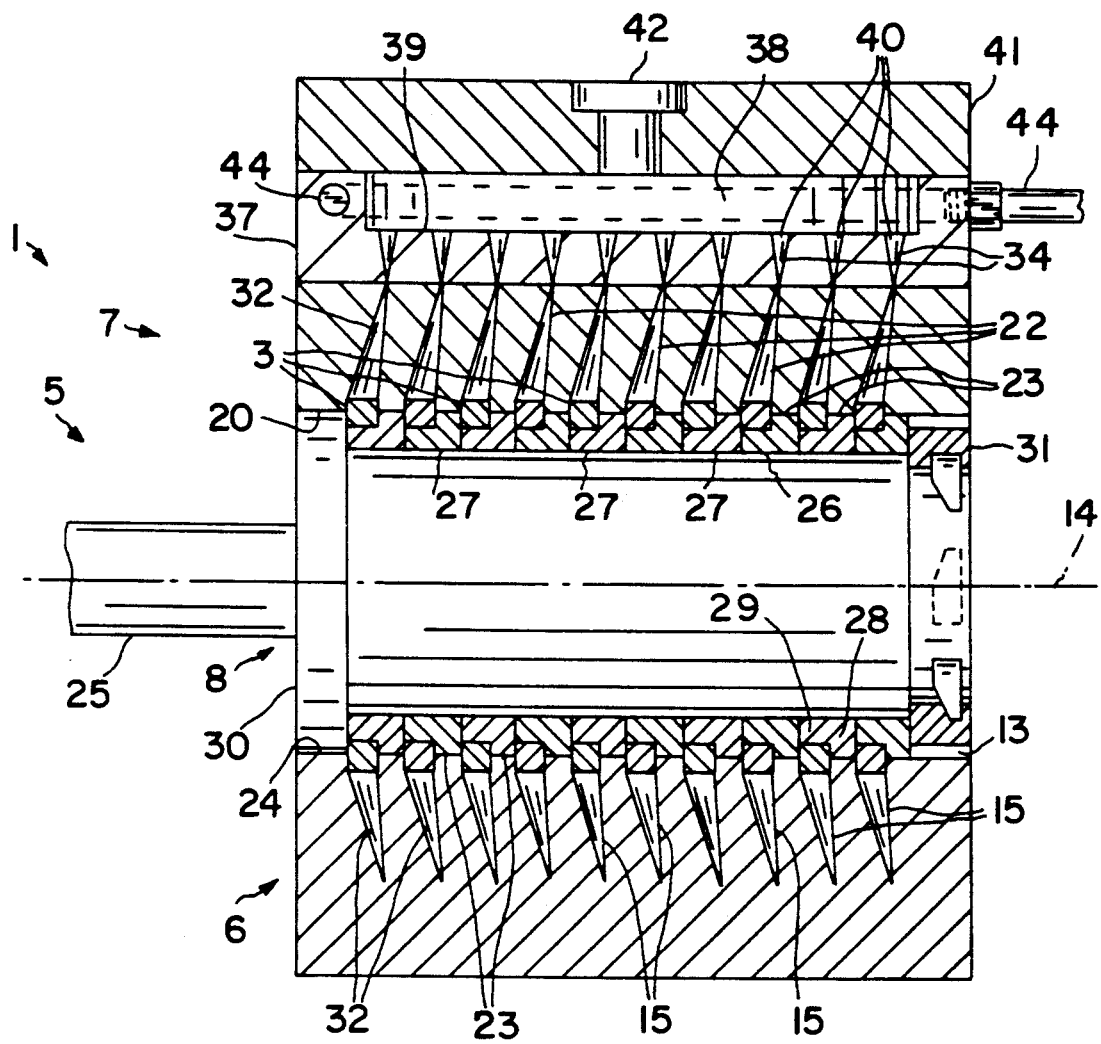
FIG. 4 shows a section taken along line IV—IV in FIG. 3.

As shown in FIG. 4, each spacer ring 27 comprises a first externally-cylindrical annular portion 28 of the same diameter and length, measured along axis 14, as strips 23; and a second externally-cylindrical annular portion 29 of the same length and diameter as the inside diameter of beads 3. The outside diameter of annular portion 28 is smaller than the outside diameter and larger than the inside diameter of beads 3.

In actual use, a number of spacer rings 27, equal in number of chambers 22 and each supporting a bead 3, are packed onto shaft 25 located outside mold 5 and coaxial with axis 14. For this purpose, the end of shaft 25 opposite the end facing mold 5 presents a fixed annular shoulder 30 onto which the first of said spacer rings 27 complete with respective bead 3 is mounted. Each successive bead 3 is then mounted onto shaft 25 by means of a respective spacer ring 27, and the pack of spacer rings 27 so formed is clamped by fitting a clamping device 31 onto the end of shaft 25.

When half molds 6 and 7 are closed about core 8, each bead 3 engages an inner annular peripheral portion of a respective chamber 22, while the outer surface of portion 28 of each spacer ring 27 contacts, in substantially fluid-tight manner, a respective cylindrical strip 23.

In addition to the inner peripheral portion housing respective bead 3, each chamber 22 presents a peripheral, triangular-section, outer annular portion 32, the outer periphery of which is intercepted by an axial groove 33 formed on top surface 17 of half mold 7, and communicates externally through a slot 34 opening onto the bottom surface of groove 33.

Groove 33 houses a portion of the terminal element 35 of an injection device 36 shown only partially in the accompanying drawings and comprising, in addition to terminal element 35, a known feed device (not shown) for feeding green or uncured elastomeric material under pressure to terminal element 35.

Terminal element 35 comprises a body 37 in the form of a rectangular parallelepipedon, housed inside groove 33 and having, at the top, an elongated distribution tank 38, the bottom of which is defined by a wall 39 having a number of aligned through slots 40, each communicating with a respective slot 34. Terminal element 35 also comprises a cover plate 41 connected to the top surface 17 of half mold 7, and which provides for maintaining body 37 inside groove 33 as well as for closing the top of tank 38. An injection hole 42 formed through plate 41 enables communication between tank 38 and said feed device (not shown).

Terminal element 35 also comprises a cooling device 43 for tank 38, for maintaining the elastomeric material inside tank 38 below a given temperature and so preventing a premature curing reaction from originating, in use, inside said elastomeric material. Cooling device 43 comprises a conduit 44 extending through body 37 and partially about tank 38. Finally, core 8 presents a heating device 47 defined, in the example shown, by electrical resistors 48 extending inside core 8.

Figure 5:
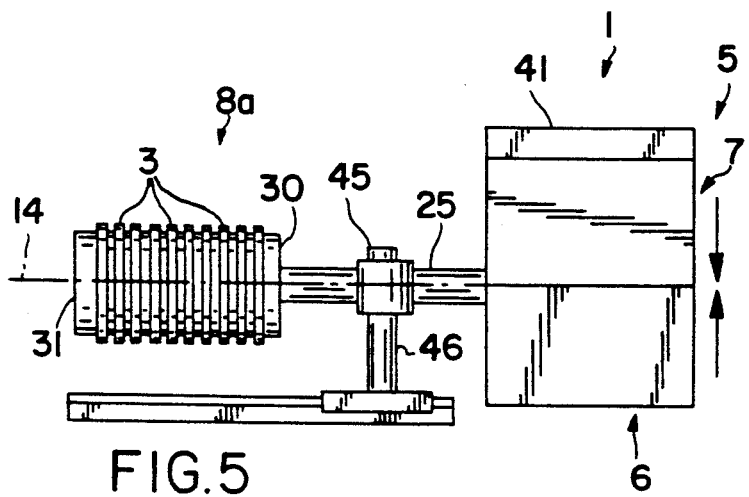
FIGS. 5 to 7 show schematic views of the above device in three different operating positions.
Figure 6:
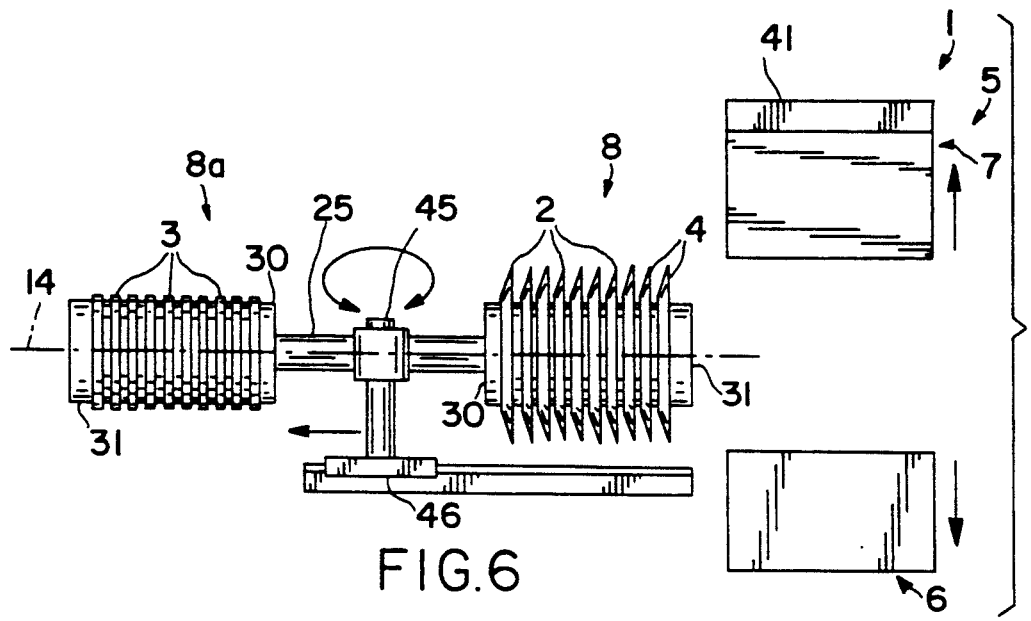
Figure 7:
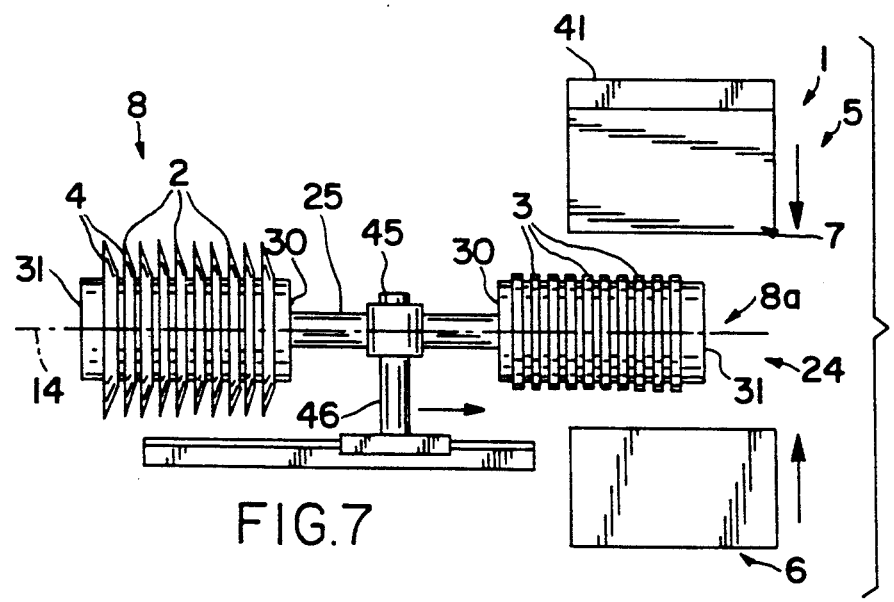

The operation of device 1 will be described with reference to FIGS. 5 to 7, and commencing (FIG. 5) with mold 5 closed about core 8 and in the process of curing a number of bead fillers 4 just formed onto the outer periphery of respective beads 3.

In the embodiment shown, on the opposite end to that fitted with core 8, shaft 25 is fitted with a second identical core 8a, and is connected centrally and in rotary manner to a vertical pin 45 perpendicular to the axis of shaft 25 and mounted on a slide 46 traveling to and from mold 5 in a direction parallel to axis 14. Consequently, while core 8 is engaged inside seat 24, core 8a is perfectly accessible and may thus be fitted, as already described, with beads 3 during the interval required for curing bead fillers 4.

When curing is completed (FIG. 6), mold 5 is opened; slide 46 is withdrawn from mold 5 to remove core 8 from between half molds 6 and 7; and shaft 25 is rotated, by means not shown, 180° about the axis of pin 45, to reverse the positions of cores 8 and 8a and so position core 8a facing mold 5. Heating device 47 is operated permanently so as to preheat beads 3 to a given temperature prior to insertion inside mold 5.

Subsequently (FIG. 7), slide 46 is moved towards mold 5, so as to set up core 8a in the operating position between half molds 6 and 7, which are then closed for performing the injection cycle via injection device 36 and curing bead fillers 4. During the interval in which core 8a remains in the operating position between closed half molds 6 and 7, the finished assemblies 2 on core 8 are offloaded and replaced by a new pack of beads 3.

During the injection cycle, green elastomeric material in paste form and at relatively high temperature is injected through hole 42 so as to force the previously injected elastomeric material in tank 38 out through slots 40 and 34 and into the peripheral portion 32 of each chamber 22 not occupied by respective bead 3 and having the same section as the required bead fillers 4.

Device 1 therefore provides for producing assemblies 2, not only in a substantially continuous cycle, but also with jointfree bead fillers 4 substantially in the form of a perfectly round ring. This is achieved by virtue of forming bead fillers 4 on respective beads 3 mounted on a cylindrical supporting surface throughout the injection stage, and is maintained by virtue of the original annular shape of bead fillers 4, and the total absence of internal stress resulting from a reversion in form.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method for producing vehicle tire bead-bead filler assemblies, comprising the steps of mounting, in orderly sequence, a number of annular beads onto a supporting body constituting an inner core removable from a mold, said mold comprising two half molds, said core defining, in an operating position between said half molds, an inner periphery of a number of separate annular chambers designed to receive a respective bead; assembling said core in said operating position; injecting elastomeric material simultaneously inside each of said annular chambers for forming a bead filler of elastomeric material about each of said beads; curing the bead filler about each of said beads so as to form cured tire bead-bead filler assemblies; and opening said half molds for removing said core carrying said cured tire bead-bead filler assemblies out of said molds; said elastomeric material being injected inside said annular chambers via a distribution tank communicating with all said annular chambers.

2. A method as claimed in claim 1, wherein assembling said core in said operating position between the half molds comprises the further step of rotating said core by a given angle about an axis perpendicular to its longitudinal axis.

3. A method as claimed in claim 2, wherein said given angle is 180°.

4. A method as claimed in claim 1, wherein said distribution tank is controlled by cooling means, to prevent the elastomeric material inside said tank from exceeding a given temperature.

5. A method as claimed in claim 1, comprising the further step of preheating said beads on said core.

6. A device for producing vehicle tire bead-bead filler assemblies, comprising a device for injecting elastomeric material; and a mold connected to said injection device and in turn comprising first and second half molds; a removable inner core comprising an inner shaft, a number of substantially annular spacers, mounted in a removable manner on said inner shaft, designed to contact an inner periphery of said beads and to separate adjacent beads when mounted on said inner shaft; said removable inner core, when mounted in an operating position between said half molds, defines with said half molds, a number of annular chambers coaxial with and defined internally by said core; each of said annular chambers comprising an inner annular portion for engaging a respective one of said beads mounted on said core, and an outer annular portion constituting a molding chamber for a respective bead fillers; said injection device comprising a distribution tank communicating with said molding chambers.

7. A device as claimed in claim 6, further comprising cooling means for said distribution tank, for maintaining the elastomeric material inside said tank below a given temperature and so preventing a premature curing reaction from originating, in use, within said elastomeric material.

8. A device a claimed in claim 6, further comprising a further core; said two cores being coaxial, and supporting means being provided for supporting said cores for rotation about an axis perpendicular to their common axis.

9. A device as claimed in claim 8, wherein the outside diameter of each of said annular spacers is smaller than the outside diameter of said beads.

10. A device as claimed in claim 9 wherein said mold includes a cylindrical seat between said half molds and is engaged by said core in said operating position; each of said half molds, including, along said seat, an orderly sequence of semicircular grooves, which define said annular chambers.

11. A device as claimed in claim 10 wherein each of said spacers comprise first and second externally-cylindrical annular portions, said first externally-cylindrical annular portion having a diameter substantially identical to that of said cylindrical seat, and cooperating in a fluid-tight manner with a respective cylindrical strip of said cylindrical seat.

12. A device as claimed in claim 6 wherein said core includes internal heating means.

* * * * *